United States Patent
Zipperle

(10) Patent No.: US 12,134,370 B2
(45) Date of Patent: Nov. 5, 2024

(54) STORAGE COMPARTMENT, IN PARTICULAR LOCKABLE STORAGE COMPARTMENT, FOR A VEHICLE AND VEHICLE

(71) Applicant: Mercedes-Benz Group AG, Stuttgart (DE)

(72) Inventor: Ralf Zipperle, Althengstett Ottenbronn (DE)

(73) Assignee: Daimler AG, Stuttgart (DE)

( * ) Notice: Subject to any disclaimer, the term of this patent is extended or adjusted under 35 U.S.C. 154(b) by 234 days.

(21) Appl. No.: 17/788,230

(22) PCT Filed: Dec. 16, 2020

(86) PCT No.: PCT/EP2020/086434
§ 371 (c)(1),
(2) Date: Jun. 22, 2022

(87) PCT Pub. No.: WO2021/130077
PCT Pub. Date: Jul. 1, 2021

(65) Prior Publication Data
US 2023/0036505 A1     Feb. 2, 2023

(30) Foreign Application Priority Data
Dec. 23, 2019  (DE) .................... 10 2019 009 051.9

(51) Int. Cl.
*B60R 7/04*       (2006.01)
*E05F 15/627*    (2015.01)

(52) U.S. Cl.
CPC ............ *B60R 7/04* (2013.01); *E05F 15/627* (2015.01); *E05Y 2900/538* (2013.01)

(58) Field of Classification Search
CPC .. B60R 2011/0007; B60R 7/04; E05F 15/627; E05Y 2900/538
(Continued)

(56) References Cited

U.S. PATENT DOCUMENTS 6,609,631 B2 * 8/2003 Asami ................ B60N 2/793
                                                220/817
6,932,402 B2 * 8/2005 Niwa ................... B60R 7/04
                                                296/37.8
(Continued)

FOREIGN PATENT DOCUMENTS

DE  10 2006 006 236 A1   8/2007
EP   1 486 374 A1        12/2004
(Continued)

OTHER PUBLICATIONS

PCT/EP2020/086434, International Search Report dated Mar. 15, 2021 (Two (2) pages).
(Continued)

*Primary Examiner* — Jason S Morrow
(74) *Attorney, Agent, or Firm* — Crowell & Moring LLP

(57) ABSTRACT

A storage compartment of a vehicle includes at least two covering elements disposed one behind the other in a longitudinal direction of the vehicle in a closed position where the at least two covering elements are shiftable out of the closed position into an open position guided by forced guides and where the at least two covering elements in the open position enclose an angle of at least −45° to at most 45° with a vertical direction of the vehicle. The at least two covering elements are shiftable between the closed position and the open position by an actuator device. At least two catches respectively engage on the at least two covering elements where the at least two catches are respectively hinged on at least two circularly moveable drive elements of the actuator device.

8 Claims, 4 Drawing Sheets

(58) Field of Classification Search
USPC ...................................................... 296/24.34
See application file for complete search history.

(56) References Cited

U.S. PATENT DOCUMENTS

| | | | | |
|---|---|---|---|---|
| 7,064,285 B2* | 6/2006 | Ichimaru | ................. | E05F 5/022 49/503 |
| 7,125,063 B2* | 10/2006 | Kawamoto | ............... | B60R 7/04 296/37.8 |
| 7,234,746 B2* | 6/2007 | Sakakibara | ............... | B60R 7/04 296/37.8 |
| 7,374,220 B2* | 5/2008 | Ichimaru | ................. | B60R 11/02 296/37.1 |
| 7,740,299 B2* | 6/2010 | Reischer | ................ | B60N 2/793 296/153 |
| 8,074,832 B2* | 12/2011 | Fujiwara | ................ | B60N 2/793 220/811 |
| 8,684,440 B2* | 4/2014 | Hishon | .................. | B60N 3/101 296/37.8 |
| 9,038,842 B2* | 5/2015 | Doll | ......................... | B60R 7/06 220/264 |
| 10,077,592 B1* | 9/2018 | Thorsell | ................ | E05F 17/004 |
| 10,220,746 B2* | 3/2019 | Choi | ......................... | B60R 7/04 |
| 10,315,545 B2* | 6/2019 | Choi | ...................... | B60N 2/767 |
| 10,717,390 B2* | 7/2020 | Anderson | ................ | E05B 83/32 |
| 11,203,300 B2* | 12/2021 | Fujiwara | .................. | B60R 7/04 |
| 11,220,197 B2* | 1/2022 | Hodgson | ................ | B60N 2/793 |
| 11,541,818 B2* | 1/2023 | Fukui | ........................ | B60R 7/04 |
| 11,873,668 B2* | 1/2024 | Piccin | ..................... | E05B 81/77 |
| 2005/0248170 A1 | 11/2005 | Kawamoto et al. | | |
| 2007/0144853 A1* | 6/2007 | Leopold | .................. | B60R 11/02 192/3.29 |
| 2010/0102061 A1* | 4/2010 | Hamaguchi | .............. | B60N 3/08 220/255 |
| 2010/0154309 A1* | 6/2010 | Shibata | ..................... | E05F 5/00 49/338 |
| 2023/0008478 A1* | 1/2023 | Falinski | ................... | B60R 7/04 |
| 2023/0036505 A1* | 2/2023 | Zipperle | ............... | E05F 15/627 |

FOREIGN PATENT DOCUMENTS

| | | |
|---|---|---|
| EP | 3 458 306 B1 | 3/2019 |
| WO | WO 2007/095731 A1 | 8/2007 |

OTHER PUBLICATIONS

German-language German Office Action issued in German application No. 10 2019 009 051.9 dated Aug. 26, 2020 (Six (6) pages).

* cited by examiner

STORAGE COMPARTMENT, IN PARTICULAR LOCKABLE STORAGE COMPARTMENT, FOR A VEHICLE AND VEHICLE

BACKGROUND AND SUMMARY OF THE INVENTION

The invention relates to a storage compartment, in particular a lockable storage compartment, for a vehicle and a vehicle.

Storage compartments of the kind addressed here are known. For example, storage compartments are known in which a cover is screwed or slid on. The disadvantage here is that a corresponding construction space has to be respectively provided for the cover, in which construction space the cover can be arranged, in particular stowed away, when the storage compartment is in an open position. However, construction space is a valuable commodity, in particular in the automotive sector, which should [lacuna] to the driver and/or the passengers of the vehicle, in particular for a high degree of driving comfort.

A lockable container or compartment, in particular for motor vehicles, is known from the German published patent application DE 10 2006 006 236 A1. At least two covering parts that come to rest substantially next to each other in the closed position of the container are provided which can be shifted into an open position of the container by means of forced guides, in which open position the at least two covering parts at least regionally overlap. The disadvantage here, however, is that an increased construction space need, in particular, for arranging, or stowing away, the cover in an open position of the container must be provided before or after opening the container in the driving direction of the vehicle. Such construction space is often not available.

Furthermore, a cover arrangement emerges from the US patent application US 2005/0248170 A1 which has two covers arranged one behind the other and can be opened by means of an engine. The disadvantage here is the complicated design of the opening mechanism.

The object of the invention is thus to create a storage compartment, in particular a lockable storage compartment, for a vehicle, preferably a motor vehicle, and a vehicle, wherein the disadvantages do not arise.

The object is solved by the present technical teachings being provided, in particular the teachings of the independent claims and the preferred exemplary embodiments disclosed in the dependent claims and the description.

The object is solved, in particular, by a storage compartment, in particular a lockable storage compartment, for a vehicle, preferably a motor vehicle, being created, having at least two covering elements arranged one behind the other in a closed position in the longitudinal direction of the vehicle, sometimes also referred to as the travelling direction of the vehicle or the X-direction, wherein the at least two covering elements can be shifted out of the closed position into an open position guided by forced guides, wherein the at least two covering elements can be shifted between the closed position and the open position by means of an actuator device, wherein the at least two covering elements in the open position enclose an angle of from at least 0° to at most 45° with a vertical direction of the vehicle, sometimes also referred to as the Z-direction. Here, the angles can have the same or different signs. This has the advantage, in particular, that a cover of the storage compartment can be arranged, in particular stowed away, with as little construction space as possible in a way optimised for construction space. In doing so, it is easily achieved that the cover of the storage compartment can be stowed away even with a small amount of available construction space, and here the cover does not interfere when using the storage compartment.

Moreover, a catch engages in each case on the at least two covering elements, wherein the at least two catches are each hinged on a circularly moveable drive element of the actuator device in each case. This has the advantage, in particular, that an active connection can easily be obtained between the at least two covering elements and the actuator device, wherein the arrangement of the at least two covering elements particularly optimised in terms of construction space is also obtained.

Furthermore, it is preferably provided that the at least two covering elements in the open position each enclose an angle of at least 3° up to at most 40°, preferably at least 5° up to at most 35°, particularly preferably of at least 10° to at most 25°, with the vertical direction of the vehicle. This has the advantage, in particular, that the at least two covering elements can be stowed away particularly effectively and with a low need of construction space in a simple manner.

According to a development of the invention, it is provided that the forced guides are formed in such a way that the at least two covering elements are arranged one next to the other in the longitudinal direction of the vehicle, preferably in a rear region—in the longitudinal direction of the vehicle—of the storage compartment in an open position. The term one next to the other states, in particular, that the at least two covering elements are preferably arranged substantially in parallel to one another and at a 90° angle to the longitudinal direction of the vehicle. This has the advantage, in particular, that the at least two covering elements can be arranged in the storage compartment particularly easily and efficiently while using as little construction space as possible.

According to a development of the invention, it is provided that the forced guides have guiding channels, in which guiding elements, for example pins or bolts, engage. Correspondingly, it is preferably provided that the at least two covering elements each have at least one guiding element, preferably on both sides in the transverse direction of the vehicle, such as pins or bolts, for example, wherein the guiding elements are preferably also set up correspondingly to the guiding channels. This has the advantage, in particular, that a forced guide can be obtained for the at least two covering elements in a simple manner.

Furthermore, it is preferably provided that the forced guides of the storage compartment are each arranged on each side on a plane in parallel to the driving direction of the vehicle and spaced apart in the transverse direction of the vehicle, such that, in the installation position of the at least two covering elements, the guiding elements of the at least two covering elements can engage in the forced guides of the storage compartment to the left and to the right of the longitudinal direction of the vehicle. This has the advantage, in particular, that an efficient guide and an arrangement that is optimised in terms of construction space, in particular mounting and/or stowage, of the at least two covering elements in the storage compartment can be simply achieved.

According to a development of the invention, it is provided that the at least two covering elements have the same width in the transverse direction of the vehicle, preferably substantially. This has the advantage, in particular, that this is particularly advantageous to the effect that the same parts can be used for both covering elements.

According to a development of the invention, it is provided that the at least two catches are each hinged via a joint or a lever mechanism, in particular a knee lever mechanism, on a circularly moveable drive element of the actuator device in each case. This has the advantage, in particular, that an active connection between the at least two covering elements and the actuator device can be obtained in a simple manner, wherein the arrangement of the at least two covering elements that is optimised, in particular, in terms of construction space is obtained.

Furthermore, it is preferably provided that the actuator device is driven electrically and/or fluidically technically, in particular hydraulically or pneumatically.

According to a development of the invention, it is provided that the at least two drive elements are actively connected to each other and to an engine, in particular an electric engine, by means of a transmission element, in particular a fan belt or cambelt or chain. This has the advantage, in particular, that a synchronisation of the at least two moveable drive elements, in particular, can be obtained in a simple manner and here a corresponding actuation of is also obtained via the engine. The term transmission element, in particular, means that an active connection is achieved between the at least two drive elements and the engine. In particular, this also includes the possibility that the two drive elements are connected to a transmission element and, in turn, the engine to a further transmission element with the at least two drive elements. In this respect, the use of the singular does not necessarily mean that thus also only one transmission element is meant, but rather several transmission elements too, wherein several fan belts and/or cambelts and/or chains can also be meant, in particular.

According to a development of the invention, the storage compartment is characterized by a spring accumulator, in opposition to the force of which the at least two covering elements can be shifted into the open position. This has the advantage, in particular, that the at least two covering elements can be shifted out of the open position into the closed position in a simple manner and in a manner that is particularly gentle on the actuator device.

According to a development of the invention, it is provided that the at least two covering elements are each chamfered and/or rounded on their edges. This has the advantage, in particular, that a particularly problem-free shifting between the open and closed position can be obtained by means of the chamfered and/or rounded edges, wherein sharp edges in particular, which can optionally constitute a possible danger spot for a user of the storage compartment, are also avoided.

According to a development of the invention, it is provided that the forced guides, in particular the guiding channels, are each formed as slide guides, in such a way that the at least two covering elements can be shifted out of an alignment arranged one behind the other in the closed position—in the longitudinal direction of the vehicle—into an alignment in parallel to the vertical direction of the vehicle and arranged one next to the other in the longitudinal direction of the vehicle. This has the advantage, in particular, that the at least two covering elements can be arranged, in particular stowed away, in a particularly simple manner.

The object is also solved, in particular, by a vehicle, in particular a motor vehicle, being created, having a storage compartment according to the invention or having a storage compartment according to one of the exemplary embodiments mentioned above. In conjunction with the vehicle, the advantages that have already been explained in relation to the storage compartment are realised, in particular.

The invention is explained in more detail below by means of the drawings.

DETAILED DESCRIPTION OF THE DRAWINGS

Figure 1:
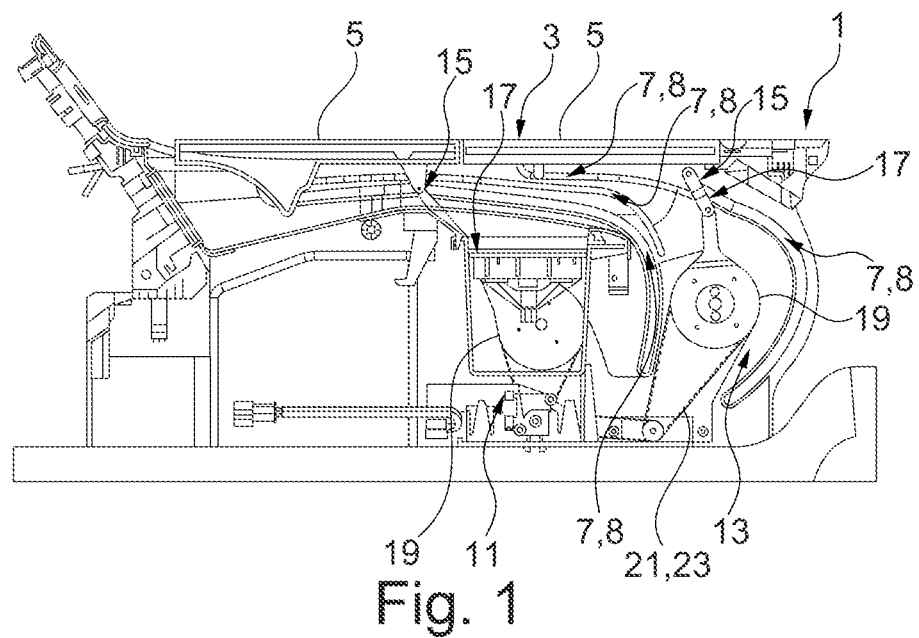
FIG. 1 is a schematic depiction of an exemplary embodiment of the storage compartment.

A schematic depiction of an exemplary embodiment of the storage compartment 1, in particular a lockable storage compartment, for a vehicle, in particular, preferably a motor vehicle, can be seen in FIG. 1, having at least two covering elements 5 arranged one behind the other in the longitudinal direction of the vehicle—horizontally in FIG. 1, sometimes also called the travelling direction of the vehicle or the X-direction—in a closed position 3.

The at least two covering elements 5 can be shifted by means of the forced guides 7 out of the closed position 3 into an open position 9.

The at least two covering elements 5 can be shifted by means of an actuator device 11 between the closed position 3 and the open position 9.

In the open position 9, the at least two covering elements 5 enclose an angle of at least 0° to at most 45° with a vertical direction of the vehicle—vertically in FIG. 1, sometimes also referred to as the Z-direction.

Figure 3:
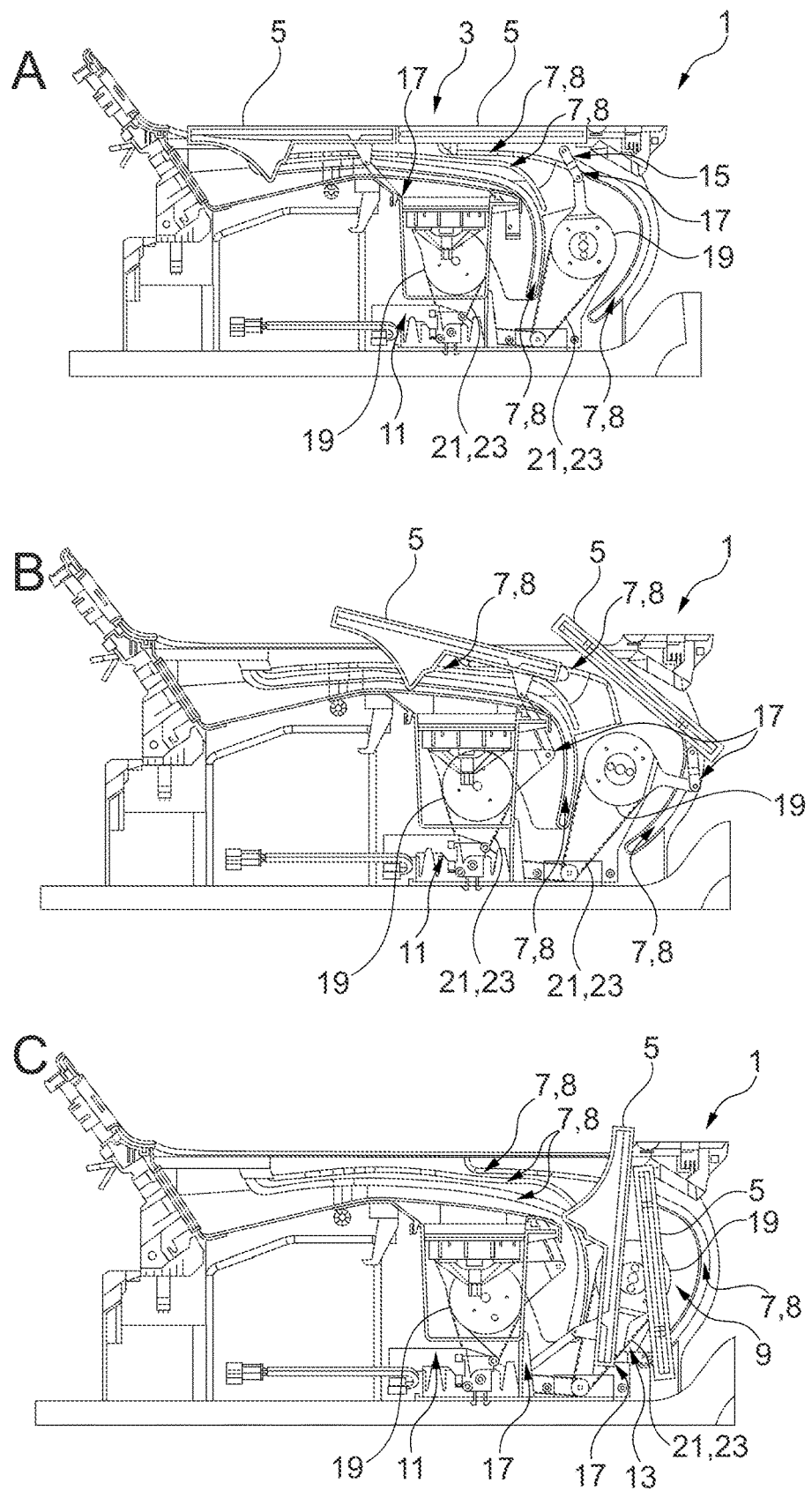
FIG. 3, in three partial figures A-C, illustrates a corresponding course of a shifting of the at least two covering elements out of a closed position into an open position.

The open position 9 is only shown in partial figure C of FIG. 3.

Furthermore, it can be seen from partial figure C of FIG. 3 that the forced guides 7 are formed in such a way that the at least two covering elements 5 in the open position 9 are arranged one next to the other in the longitudinal direction of the vehicle, preferably in a rear region 13—in the longitudinal direction of the vehicle—of the storage compartment 1.

Figure 2:
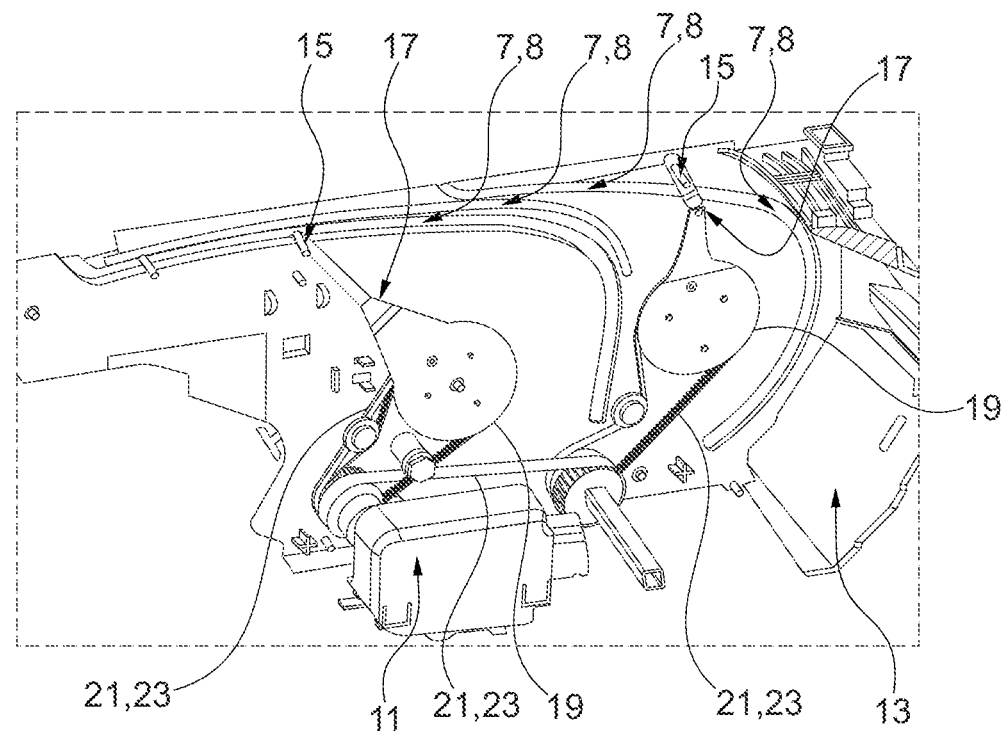
FIG. 2 is a detailed view of forced guides of the exemplary embodiment of the storage compartment from FIG. 1.

It can be seen in FIGS. 1 to 3 that the forced guides 7 have guiding channels in which guiding elements, for example pins or bolts, can engage.

Furthermore, it is preferably provided that the at least two covering elements 5 have the same extension, in particular width, in the transverse direction of the vehicle, preferably substantially.

It can be seen from the figures that a catch 15 (not shown in FIG. 3 for a better overall view) engages in each case on the at two covering elements 5, wherein the at least two catches 15 are each hinged, preferably via a joint or lever mechanism, preferably a knee lever mechanism 17, in each case on a circularly moveable drive element 19 of the actuator device 11.

Furthermore, it can be seen in the figures that the at least two drive elements 19 are actively connected to each other and an engine, in particular an electric engine, of the actuator device 11 by means of at least one transmission element 21, in particular a fan belt or cambelt 23 or chain.

Furthermore, the storage compartment is preferably characterized by a spring accumulator (not shown in the figures), in opposition to the force of which the at least two covering elements 5 can be shifted into the open position 9.

Furthermore, it is preferably provided that the at least two covering elements 5 are each chamfered and/or rounded on their edges.

Furthermore, it can be seen in the figures that the forced guides 7, in particular the guiding channels 8, are each formed as slide guides, in such a way that the at least two covering elements 5 can be shifted out of an alignment in the closed position 3 arranged one behind the other—in the longitudinal direction of the vehicle—into an alignment in parallel in the vertical direction of the vehicle and/or arranged one next to the other in the longitudinal direction of the vehicle.

In particular, it can be seen from FIG. 1 that, in the closed position, in particular the covering element 5 arranged to the front in the driving direction is forced by means of the moveable drive element 19—mediated by the knee lever mechanism 17 and the catch 15—into the closed position and is thus supported, in particular upwardly by a force, in particular latched.

Figure 4:
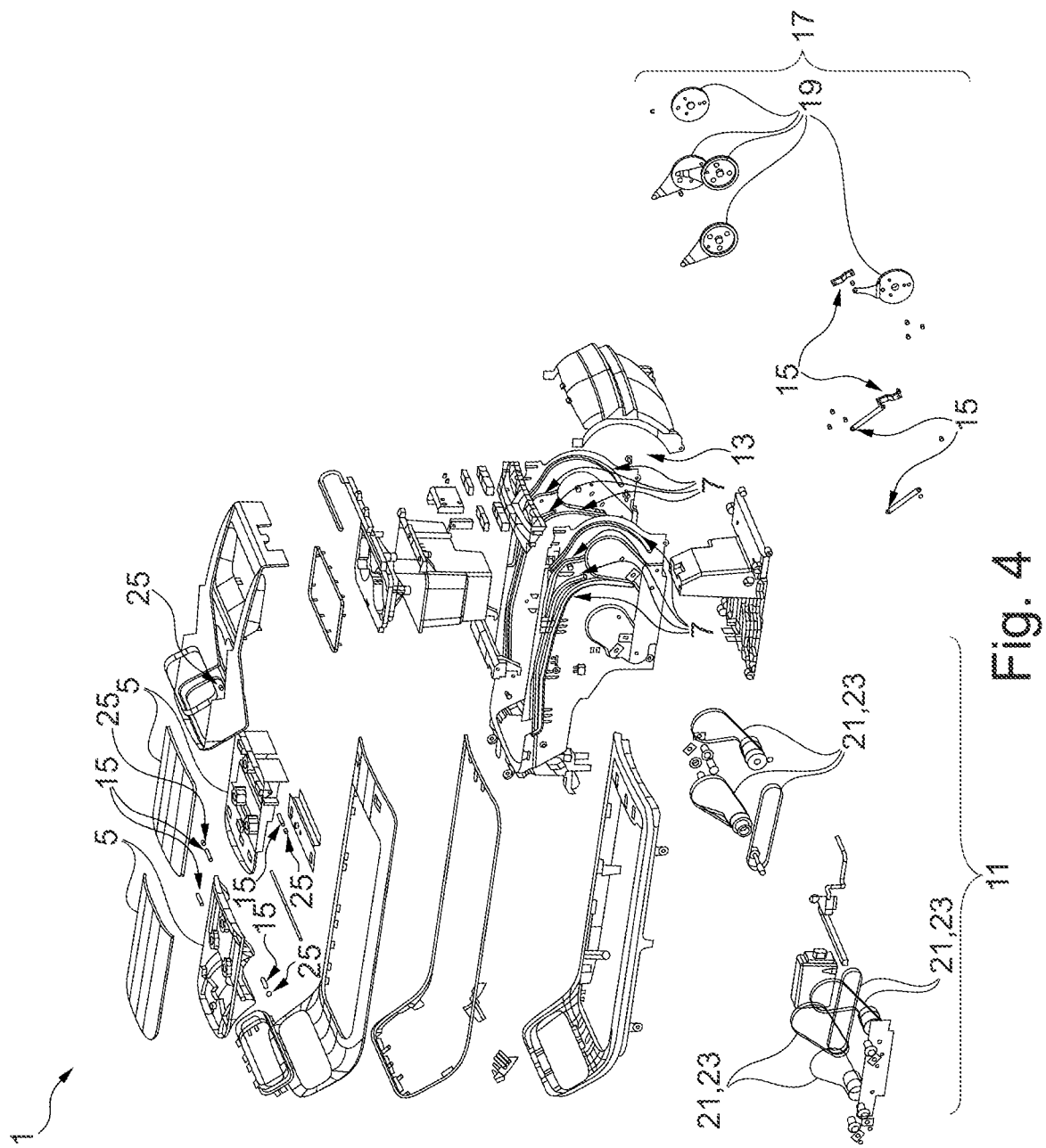
FIG. 4 is a schematic exploded diagram of a second exemplary embodiment of the storage compartment, wherein the storage compartment is depicted in more detail.

A schematic explosion diagram of a second exemplary embodiment of the storage compartment 1 can be seen in FIG. 4, wherein the storage compartment 1 is depicted in more detail.

In particular, two covering elements 5 arranged one behind the other can be seen in FIG. 4, wherein the at least two covering elements 5 can be shifted out of the closed position (not shown in FIG. 4) into the open position (not shown in FIG. 4), guided by forced guides 7.

Moreover, the actuator device 11 can be seen in FIG. 4, by means of which the at least two covering elements 5 can be shifted between the closed position (not shown in FIG. 4) and the open position (not shown in FIG. 4).

Furthermore, it can be seen from FIG. 4 that the forced guides 7 have guiding channels 8, into which guiding elements engage. In FIG. 4, these guiding elements are designed as pins and/or bolts 25.

Furthermore, it can be seen from FIG. 4 that the at least two covering elements 5 have the same width in the transverse direction of the vehicle, preferably substantially.

Moreover, it can be seen in FIG. 4 that in each case a catch 15 engages on the at least two covering elements 5, wherein the at least two catches 15 are each hinged, in particular arranged, preferably via a joint or lever mechanism, in particular knee lever mechanism 17, in each case on a circularly moveable drive element 19 of the actuator device 11. In FIG. 4, the point at which the guiding elements of the covering elements 5, in particular the pins and/or bolts 25, are arranged is shown by the catches 15.

In FIG. 4, the knee lever mechanism 17 can only be seen indirectly, since the elements of the knee lever mechanism are shown separately from one another. Thus, the knee lever mechanism 17 is shown in FIG. 4 with a clamp.

Moreover, the rear region 13—in the longitudinal direction of the vehicle—of the storage compartment is shown in FIG. 4, in which the at least two covering elements 5 are arranged one next to the other in the longitudinal direction of the vehicle in an open position (not shown in FIG. 4) of the at least two covering elements 5.

Furthermore, it can be seen from FIG. 4 that the at least two drive elements 19 of each of the at least two covering elements 5 has a catch 15, which is respectively arranged via a joint or lever mechanism, in particular knee lever mechanism 17, on a respectively circularly moveable drive element 19, which is why at least two drive elements 19 are actively connected to each other and to an engine, in particular an electric engine, of the actuator device 11 by means of at least one transmission element 21, in particular fan belt or cambelt 23 or chain.

Figure 5:
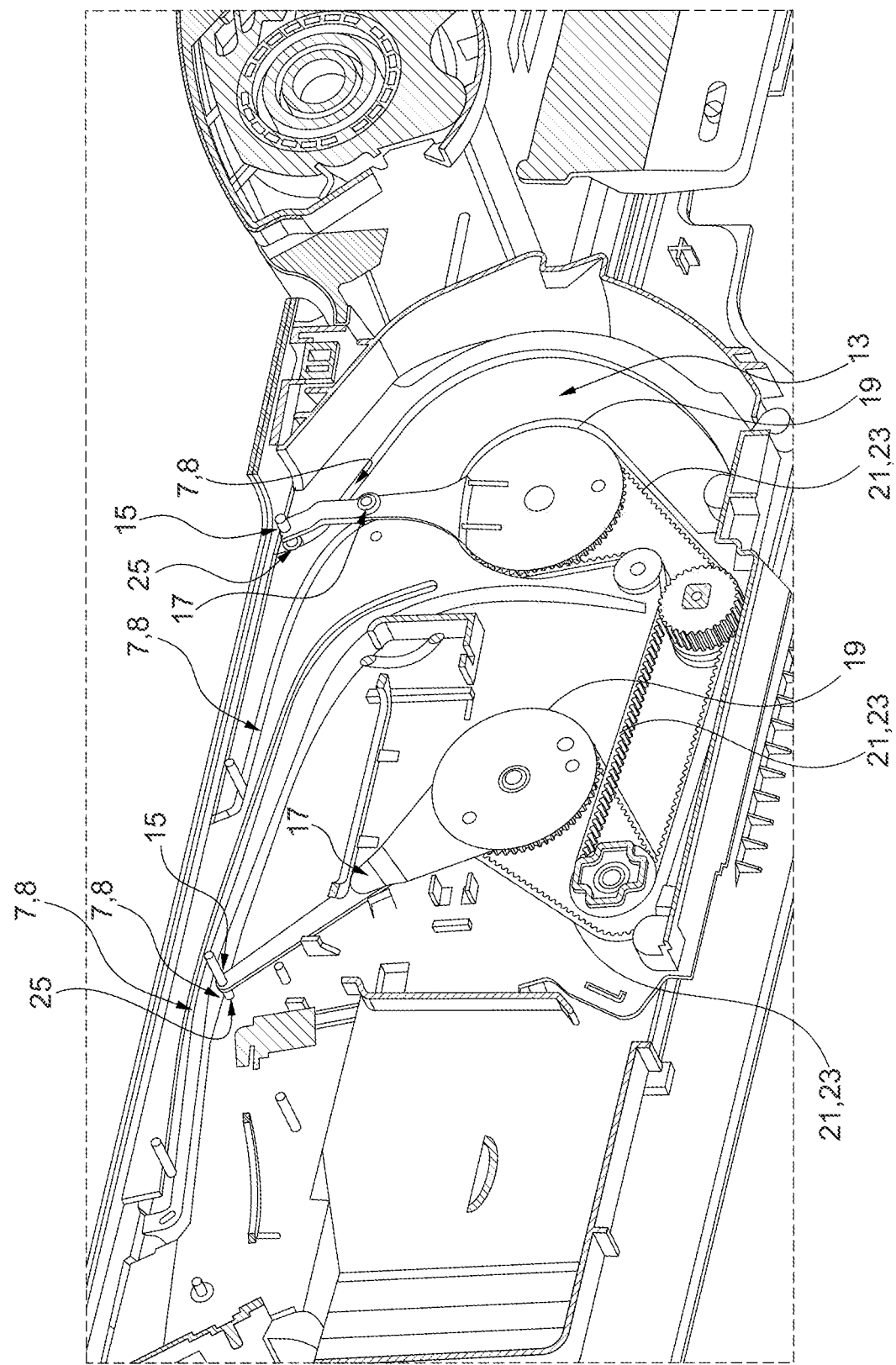
FIG. 5 is a further view of the detailed view of the force guides from FIG. 2 from a different perspective.

A further view of the detailed view of the forced guide from FIG. 2 can be seen from a different perspective in FIG. 5. Correspondingly, reference is made to the designs in relation to FIG. 2. The same or functionally identical parts are referred to with the corresponding same reference numerals.

In particular, the guiding tracks 7 formed as guiding channels 8 can be seen from FIG. 5, which are formed in a rear region of the storage compartment, in the driving direction of the vehicle, in such a way that the covering element 5 is supported from below—from a geodetical point of view—in the closed position 3 (not shown in FIG. 5), in particular by the joint arranged on the catch 15—as explained in more detail above—or by the lever mechanism, in particular by the knee lever mechanism 17. In doing so, it is possible, in particular, that the covering element 5 is safely supported without further locking devices in such a way that one can be supported on the covering element 5 with an arm (not shown in any of the figures).

It can preferably also be seen in FIG. 5 that the four guiding channels 8 shown in FIG. 5 or guiding tracks 7 are designed in such a way that the individual guiding tracks 7 do not mutually cross. In doing so, it is avoided, in particular, that corresponding guide devices, in particular in the manner of a set of points, are necessary, which steers and/or allocates the guiding elements of the covering elements 5, in particular the pins and/or bolts 25, in the correct crossing guiding track.

The invention claimed is:

1. A storage compartment of a vehicle, comprising:
at least two covering elements disposed one behind the other in a longitudinal direction of the vehicle in a closed position, wherein the at least two covering elements are shiftable out of the closed position into an open position guided by forced guides and wherein the at least two covering elements in the open position enclose an angle of at least −45° to at most 45° with a vertical direction of the vehicle;
an actuator device with at least two circularly moveable drive elements, wherein the at least two covering elements are shiftable between the closed position and the open position by the actuator device; and
at least two catches respectively engaging on the at least two covering elements, wherein the at least two catches are respectively hinged on the at least two circularly moveable drive elements of the actuator device.

2. The storage compartment according to claim 1, wherein the forced guides are configured such that the at least two covering elements in the open position are disposed one next to the other in the longitudinal direction of the vehicle and in a rear region of the storage compartment in the longitudinal direction of the vehicle.

3. The storage compartment according to claim 1, wherein the forced guides have a respective guiding channel and wherein a respective guiding element engages in the respective guiding channel.

4. The storage compartment according to claim 1, wherein the at least two covering elements have a same width in a transverse direction.

5. The storage compartment according to claim 1, wherein the at least two catches are respectively hinged on the at least two circularly moveable drive elements of the actuator device via a respective knee lever mechanism.

6. The storage compartment according to claim 1, wherein the at least two circularly moveable drive elements are connected to each other and to an engine of the actuator device by a fan belt or a cambelt or a chain.

7. The storage compartment according to claim 1, wherein the forced guides are each configured as a slide guide such that the at least two covering elements are shiftable out of a first alignment disposed one behind the other in the closed position in the longitudinal direction of the vehicle and into a second alignment disposed in parallel in the vertical direction of the vehicle or one next to the other in the longitudinal direction of the vehicle.

8. A motor vehicle, comprising:
the storage compartment according to claim 1.

* * * * *